(12) United States Patent
Pedersen

(10) Patent No.: US 9,300,160 B1
(45) Date of Patent: *Mar. 29, 2016

(54) ELIMINATION OF POWER CONSUMPTION WHEN CHARGER/ADAPTOR IS NOT IN USE

(75) Inventor: Richard N. Pedersen, Toms River, NJ (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 872 days.

This patent is subject to a terminal disclaimer.

(21) Appl. No.: 13/545,412

(22) Filed: Jul. 10, 2012

Related U.S. Application Data

(63) Continuation of application No. 12/701,700, filed on Feb. 8, 2010, now Pat. No. 8,222,861.

(51) Int. Cl.
*H02J 7/00* (2006.01)
*H02J 7/02* (2006.01)

(52) U.S. Cl.
CPC ..................................... *H02J 7/025* (2013.01)

(58) Field of Classification Search
CPC .......................................................... H02J 7/025
USPC ........................................................ 320/108
See application file for complete search history.

(56) References Cited

U.S. PATENT DOCUMENTS

| | | | |
|---|---|---|---|
| 3,802,159 A | 4/1974 | Ferdelman | |
| 4,383,212 A | 5/1983 | Ballman | |
| 4,829,224 A * | 5/1989 | Gandelman et al. | 320/116 |
| 6,052,291 A | 4/2000 | Suzuki et al. | |
| 6,104,162 A * | 8/2000 | Sainsbury | H02J 7/0057 320/107 |
| 6,339,314 B1 | 1/2002 | Bruning | |
| 6,498,456 B2 | 12/2002 | Ettes et al. | |
| 6,597,152 B1 * | 7/2003 | Jacobs et al. | 320/113 |
| 6,664,758 B2 | 12/2003 | Yang | |
| 6,960,727 B2 * | 11/2005 | Hering | H01R 13/6633 174/135 |
| 7,375,494 B2 * | 5/2008 | Daniel | H01M 2/105 320/106 |
| 7,999,417 B2 * | 8/2011 | Kato | H01F 38/14 307/149 |
| 2003/0184259 A1 * | 10/2003 | Yang | 320/107 |
| 2005/0116683 A1 * | 6/2005 | Cheng et al. | 320/108 |
| 2008/0157715 A1 * | 7/2008 | Rosenboom et al. | 320/108 |
| 2009/0075704 A1 | 3/2009 | Wang | |
| 2009/0302799 A1 * | 12/2009 | Marquet et al. | 320/101 |
| 2010/0194336 A1 * | 8/2010 | Azancot et al. | 320/108 |
| 2010/0264875 A1 * | 10/2010 | Hoffman et al. | 320/111 |

* cited by examiner

*Primary Examiner* — M'Baye Diao
(74) *Attorney, Agent, or Firm* — Howard IP Law Group

(57) ABSTRACT

A plug-and-socket arrangement connects an appliance to a mains-powered battery charger/power supply. To avoid unwanted power consumption when the appliance is disconnected from the charger/power supply, the plug-and-socket arrangement disconnects the mains power from the battery charger/power supply when the appliance plug is disconnected from the appliance socket.

20 Claims, 2 Drawing Sheets

ELIMINATION OF POWER CONSUMPTION WHEN CHARGER/ADAPTOR IS NOT IN USE

CROSS-REFERENCE TO RELATED APPLICATION

This application is a continuation of co-pending U.S. patent application Ser. No. 12/701,700, filed Feb. 8, 2010 by Richard N. Pedersen, titled "ELIMINATION OF POWER CONSUMPTION WHEN CHARGER/ADAPTOR IS NOT IN USE", the entirety of which this application is incorporated herein by reference.

BACKGROUND

There has been an increasing emphasis on reducing power usage generally. This emphasis extends to reducing electrical power usage, as from the alternating-current power mains. The recent introduction of all-electric or electrically-chargeable gas-electric hybrid automobiles has brought into focus the limitations of the power mains.

One of the little-appreciated aspects of power mains consumption lies in the ubiquitous battery-powered accessory charger, which is used to charge battery-operated appliances such as cell phones from the power mains. Many such battery-operated appliances exist, including battery-operated tools such as drills and saws, and personal grooming devices such as battery-powered toothbrushes.

A salient aspect of the use of such chargers for battery-operated appliances is that the appliances are removed from the charger for portable use. Often the charger remains in place and connected to the power mains when the appliance is removed for portable use. The term "connected" or "coupled" as used herein means "electrically connected" unless mechanical connection is clearly set forth.

Many such battery chargers use isolation transformers to protect the user of the charger from any chance of coming into contact with a power main. The transformers also provide an ancillary benefit, in that, by proper selection of the turns ratio of the primary and secondary windings, the secondary-side alternating voltage can be reduced to a range generally commensurate with the voltage of the battery or battery pack of the appliance.

It should be noted that the terms "between," "across," and other terms such as "parallel" have meanings in an electrical context which differ from their meanings in the field of mechanics or in ordinary parlance. More particularly, the term "between" in the context of signal or electrical flow relating to two separate devices, apparatuses or entities does not relate to physical location, but instead refers to the identities of the source and destination of the flow. Thus, flow of signal "between" A and B refers to source and destination, and the flow itself may be by way of a path which is nowhere physically located between the locations of A and B. The term "between" can also define the end points of the electrical field extending "across" or to points of differing voltage or potential, and the electrical conductors making the connection need not necessarily lie physically between the terminals of the source. Similarly, the term "parallel" in an electrical context can mean, for digital signals, the simultaneous generation on separate signal or conductive paths of plural individual signals, which taken together constitute the entire signal. For the case of current, the term "parallel" means that the flow of a current is divided to flow in a plurality of separated conductors, all of which are physically connected together at disparate, spatially separated locations, so that the current travels from one such location to the other by plural paths, which need not be physically parallel. In addition, discussions of circuits necessarily describe one element at a time, as language is understood in serial time. Consequently, a description of two interconnected elements may describe them as being in "series" or in "parallel," which will be true for the two elements as initially described. However, further description of the circuit may implicate other interconnected devices, which when connected to the first two devices may result in current flows which contradict the "series" or "parallel" description of the original two devices. This is an unfortunate result of the limitations of language, and all descriptions herein should be understood in that context.

SUMMARY

A mains-powered voltage adapter/charger is for powering or charging an appliance defining electrodes by which power or charging current may be applied. The adaptor/charger comprises a housing and a transformer located within the housing. The transformer includes a secondary winding and a primary winding. The primary winding defines first and second electrodes, for generating transformed voltage at the secondary winding when mains power is applied to the first and second electrodes of the primary winding. A voltage conditioner is located within the housing and is electrically coupled to the secondary winding, for generating conditioned voltage in response to the transformed voltage. A mating socket-and-plug arrangement includes at least first, second and third mating contact sets. The socket of the socket-and-plug arrangement is affixed to the housing so that the mating plug can be mated and demated therewith. The first contact of the socket of the socket-and-plug arrangement is connected to the voltage conditioner for receiving the conditioned voltage when the voltage conditioner is supplied with the transformed voltage. The second contact of the socket is connected through the housing to the second electrode of the primary winding, and the third contact of the socket is connected to a mains electrode of the housing by a conductive path extending at least partially through the housing. A conductor interconnects the second and third contacts of the plug of the plug-and-socket arrangement. A conductor extends from the first contact of the plug to one of the electrodes of the appliance, whereby, (a) when the socket and plug are mated, and mains power is applied between the first electrode of the primary winding of the transformer and the mains electrode of the housing, conditioned voltage is applied to the appliance, and (b) when mains power is applied between the first electrode of the primary winding of the transformer and the mains electrode of the housing and the socket and plug are demated, the appliance is rendered physically independent of the housing and the primary winding of the transformer is decoupled from the mains.

An energizing arrangement according to an aspect of the disclosure is for electrically energizing, from power mains, a portable or at least removable electrical appliance. The portable appliance may include a battery that can be charged when the appliance is connected to the energizing arrangement. The appliance includes first and second electrodes by which direct current or direct voltage may be applied for energization. The energizing arrangement comprises one of a socket and a plug. The one of a socket and a plug includes first, second, and third mutually isolated contacts. The other one of a socket and a plug is adapted for physical mating with the one of a socket and a plug. The other one of a socket and a plug includes first, second, and third contacts. The first contact of the other one of the socket and plug is isolated from the second and third contacts of the one of the socket and plug.

The third contact of the other one of the socket and plug is electrically common with the second contact of the other one of the socket and plug, and, when the one of the socket and plug is mated with the other one of the socket and plug, the first contact of the one of the socket and plug is connected to the first contact of the other one of the socket and plug, the second contact of the one of a socket and plug is connected to the second contact of the other one of the socket and plug, and the third contact of the other one of the socket and plug is connected to the third contact of the one of the socket and plug. The energizing arrangement includes an energizing or charging current converter, referred to herein as a "charger", which may perform voltage or current regulation, or both as in the case of a foldback regulator. The charger includes first, second, third, and fourth electrodes. The charger is energized when mains power is applied to the first and third electrodes of the charger, and when so energized, produces energizing potential between the fourth and third electrodes of the charger. A first electrical conductor is connected to the third contact of the one of a socket and plug and is adapted to be connected to the power mains. A second electrical conductor is connected to the first electrode of the charger and is adapted to be connected to the power mains. A third electrical conductor is connected to the fourth electrode of the charger and to the first contact of the other one of the socket and plug. A fourth electrical conductor is connected to the first contact of the other one of the socket and plug and to the first electrode of the appliance. A fifth electrical conductor is connected to at least one of the second and third contacts of the other one of the socket and plug and to the second electrode of the appliance. A sixth electrical conductor is connected to the third electrode of the charger and to the second contact of the one of the socket and plug. A seventh electrical conductor connects the second and third contacts of the other one of the socket and plug. As a result, when the socket and plug are mated the second and third electrodes of the charger are connected and the charger is energized, the first contact of the other one of the socket and plug is electrically connected to the first direct-current electrode of the appliance, and at least one of the second and third contacts of the other one of the socket and plug is electrically connected to the second direct-current electrode of the appliance, and the charger applies energizing or charging voltage to the appliance. When the other one of the socket and plug is not mated with the one of the socket and plug, the second and third electrodes of the charger are disconnected and the charger draws no current from the mains.

A charger or power source is for use with an appliance, where the appliance is energized or charged by application of conditioned voltage across first and second electrodes. The charger or power source comprises a housing containing a transformer. The transformer includes a primary winding defining first and second electrodes, for generating secondary power when the first and second electrodes of the transformer are energized from alternating-current power mains. The housing also includes at least one contact adapted to be connected to one side of the power mains. The housing also includes a socket of a plug-and-socket arrangement. The socket includes at least first, second, and third contacts. The second contact of the socket is connected to the second electrode of the primary winding of the transformer, the third contact of the socket is connected to the one contact of the housing whereby, when the one contact is connected to the one side of the power mains and the first electrode of the primary winding of the transformer is connected to the other side of the power mains, the one side of the power mains is also connected to the third contact of the socket and the transformer is energized. The housing also containing a power conditioner coupled to a secondary winding of the transformer, for, when the transformer is energized, generating the conditioned voltage and applying the conditioned voltage to the first contact of the socket. The charger or power source also includes a plug of the plug-and-socket arrangement. The plug includes at least first, second, and third contacts, which first, second, and third contacts mate with the first, second, and third contacts of the socket, respectively, when the plug-and-socket are mated. The first contact of the plug is connected to the first electrode of the appliance. The second contact of the plug is connected to the third contact of the plug, whereby, when the socket and plug are mated, the one side of the power mains is connected to the second electrode of the primary winding of the transformer, for generating and applying the conditioned voltage to the appliance. In one embodiment of this disclosure, the conditioner generates the conditioned voltage between the first and second contacts of the socket, and the second contact of the plug is connected to the second electrode of the appliance. In another embodiment of the disclosure, the socket comprises a fourth contact, the plug comprises a mating fourth contact, the conditioner generates the conditioned voltage between the first and fourth contacts of the socket, and the fourth contact of the plug is connected to the second electrode of the appliance.

An energizing arrangement according to an aspect of the disclosure is for electrically energizing, from power mains, a portable or at least removable electrical appliance. The portable appliance may include a battery that can be charged when the appliance is connected to the energizing arrangement. The appliance includes first and second electrodes by which direct current or direct voltage may be applied for energization. In this context, the term "electrode" refers to a point on an electrical conductor, and has the same general meaning as "terminal," "node," or "contact." The energizing arrangement comprises one of a socket and a plug. The one of a socket and a plug includes first, second, and third mutually isolated contacts. The other one of a socket and a plug is adapted for physical mating with the one of a socket and a plug. The other one of a socket and a plug includes first, second, and third contacts. The first contact of the other one of the socket and plug is isolated from the second and third contacts of the one of the socket and plug. The third contact of the other one of the socket and plug is electrically common with the second contact of the other one of the socket and plug, and, when the one of the socket and plug is mated with the other one of the socket and plug, the first contact of the one of the socket and plug is connected to the first contact of the other one of the socket and plug, the second contact of the one of a socket and plug is connected to the second contact of the other one of the socket and plug, and the third contact of the other one of the socket and plug are connected to the third contact of the one of the socket and plug. The energizing arrangement includes an energizing or charging current converter, which may perform voltage or current regulation, or both as in the case of a foldback regulator. The converter includes first, second, third, and fourth electrodes. The converter is energized when mains power is applied to the first and third electrodes of the converter, and when so energized, produces energizing potential between the fourth and third electrodes of the converter. A first electrical conductor is connected to the third contact of the one of a socket and plug and is adapted to be connected to the power mains. A second electrical conductor is connected to the first electrode of the converter and is adapted to be connected to the power mains. A third electrical conductor is connected to the fourth electrode of the converter and to the first contact of the other one of the socket and plug. A fourth electrical conductor is connected to the first contact of the one of the socket and plug and to the first electrode of the appliance. A fifth electrical conductor is connected to at least one of the second and third contacts of the other one of the socket and plug and to the second electrode of the appliance. A sixth electrical conductor is connected to the third electrode of the converter and to the second contact of the one of the socket and plug. As a result, when the socket and plug are mated the second and third electrodes of the converter are connected and the converter is energized, the first contact of the other one of the socket and plug is electrically connected to the first direct-current electrode of the appliance, and at least one of the second and third contacts of the other one of the socket and plug is electrically connected to the second direct-current electrode of the appliance. The converter applies energizing or charging voltage to the appliance, and when the other one of the socket and plug is not mated with the one of the socket and plug the converter draws no current from the mains.

An energizing arrangement according to another aspect of the disclosure is for electrically energizing from power mains a removable electrical appliance, where the appliance has first and second electrodes by which direct current may be applied for energization. The energization may result in the charging of a battery of the appliance. The energizing arrangement comprises one of a socket and a plug. The one of a socket and a plug includes first, second, third, and fourth mutually isolated contacts. The other one of a socket and a plug is adapted for physical mating with the one of a socket and a plug. The other one of a socket and a plug includes first, second, third, and fourth contacts. The third contact of the other one of the socket and plug is electrically common with the second contact of the other one of the socket and plug, and, when the one of the socket and plug is mated with the other one of the socket and plug, the first contact of the one of the socket and plug is connected to the first contact of the other one of the socket and plug, the second contact of the one of a socket and plug is connected to the second contact of the other one of the socket and plug, the second and third contacts of the other one of the socket and plug are connected to the third contact of the one of the socket and plug, and the fourth contact of the one of the socket and plug is connected to the fourth contact of the other one of the socket and plug. A converter includes first, second, third, fourth, and fifth electrodes. The converter is energized when mains power is applied to the first and third electrodes of the converter, and when so energized, produces energizing potential between the fourth and fifth electrodes of the converter. A first electrical conductor is connected to the third contact of the one of a socket and plug and is adapted to be connected to the power mains. A second electrical conductor is connected to the first electrode of the converter and is adapted to be connected to the power mains. A third electrical conductor is connected to the fourth electrode of the converter and to the first contact of the one of the socket and plug. A fourth electrical conductor is connected to the fifth electrode of the converter and to the fourth contact of the one of the socket and plug. A fifth electrical conductor is connected to the first contact of the other one of the socket and plug and to the first electrode of the appliance. A sixth electrical conductor is connected to the fourth contact of the other one of the socket and plug and to the second electrode of the appliance. A seventh electrical conductor is connected to the third electrode of the converter and to the second contact of the one of the socket and plug, whereby, when the socket and plug are mated the second and third electrodes of the converter are connected and the converter is energized, the first contact of the other one of the socket and plug is electrically connected to the first direct-current electrode of the appliance, and the fourth contact of the other one of the socket and plug is electrically connected to the second direct-current electrode of the appliance, and the converter applies energizing voltage to the appliance. When the other one of the socket and plug is not mated with the one of the socket and plug the converter draws no current from the mains.

DETAILED DESCRIPTION

Magnetic transformers such as those used for charging the batteries of portable appliances (or alternatively for powering the portable appliance while it is docked) exhibit various losses. For example, the primary side of the transformer windings may exhibit an alternating current component during charging which represents the power transferred to the secondary side of the winding. The primary winding also exhibits stray inductance, which provides a path other than the primary winding through which alternating mains current can leak. Magnetizing current is the term applied to the primary current required to generate and maintain an alternating secondary voltage in the absence of a load on the secondary winding. That is, the magnetizing current is required in order to provide transformer action.

The leakage and magnetizing currents are not large. It has been noted, however, that the cumulative effect of large numbers of battery chargers distributed over the power mains may represent a large power loss.

According to an aspect of the disclosure, a battery charger or energizer is connected to the appliance to be charged or energized by a plug-and-socket arrangement which mechanically disconnects at least one side of the primary winding of the transformer from the power mains when the appliance is disconnected from the charger.

Figure 1:
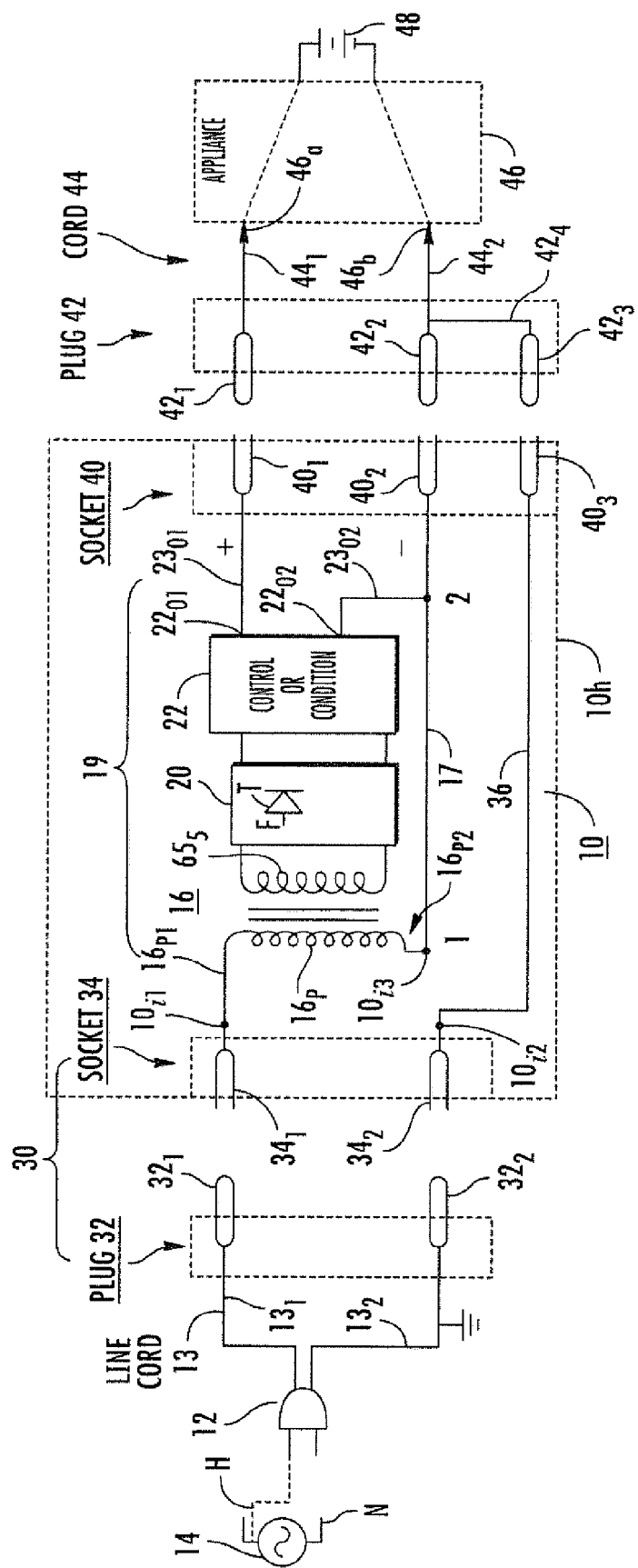
FIG. 1 is a simplified diagram in block and schematic form of a first embodiment.

FIG. 1 is a simplified diagram in block and schematic form illustrating a combination of an energizing arrangement 8 including a powering arrangement or charger 10 according to an aspect of the disclosure, including a housing 10h connected or connectible by a polarized power plug 12 to the alternating-power mains 14. Power-arrangement/charger 10 is also connected or connectible by way of a socket 40, plug 42, and conductive path 44 to an appliance 46 to be powered or energized. A battery symbol 48 represents a battery which may be used in appliance 46 for portable applications.

In FIG. 1, the charger 10 includes an isolation transformer 16 having a primary winding 16$p$ and a secondary winding 16$s$. The electrodes or connections of primary winding 16$p$ are designated 16$p$1 and 16$p$2, respectively. The secondary winding 16$s$ is connected to a voltage conditioner 19 illustrated as including a rectifier arrangement illustrated as a block 20 and a voltage conditioning or converting circuit illustrated as a block 22. Rectifier block 20 generates direct voltage for application to voltage conditioning or converting circuit 22. Voltage conditioning block 22 may include a voltage or current regulator, or both, as in the case of a foldback regulator. It may include a surge arrester, or in some cases it may simply convey power if conditioning is not required. The output direct voltage from conditioner 22 is represented by + and − symbols at electrical conductors 23$o$1 and 23$o$2. Those skilled in the art know that the + and − polarizations may be the opposite of that illustrated. As illustrated, conductor 23o2 is connected to primary winding conductor 16p2 within charger 10 by way of a conductor 17 and a node 10i3. Node 10i3, and conductors 17 and 23o2 are connected to socket element 40$_2$.

In FIG. 1, it is expected that alternating-current (AC) mains voltage will be applied from the mains 14 to AC "input" points 10i1 and 10i2 of charger 10. Such a connection may be made directly by a polarized power plug 12 and a two-conductor line cord 13, or by polarized power plug 12, two-conductor line cord 13, and a plug-and-socket arrangement 30. Line cord 13 includes first and second conductors 13$_1$ and 13$_2$. Conductor 13$_2$ is illustrated as being the neutral. Plug-and-socket arrangement 30 includes a two-element plug 32 connected to the conductors 13$_1$ and 13$_2$ of line cord 13, together with a socket 34. Conductor 13$_1$ connects to element 32$_1$ which in turn connects to element 34$_1$ when 32 and 34 are mated. Likewise, conductor 13$_2$ connects to element 32$_2$ which in turn connects to element 34$_2$ when 32 and 34 are mated. The elements 34$_1$ and 34$_2$ of socket 34 are connected to AC "input" points 10i1 and 10i2, respectively, of charger 10. When plug-and-socket 30 is mated and line plug 12 is connected to the power mains, mains alternating voltage is applied to points 10i1 and 10i2. Thus, whether by means of a simple line cord or by a line cord with a plug-and-socket arrangement, power is applied to points 10i1 and 10i2. This is not sufficient to energize the charger. It should be noted that while the terms "plug" and "socket" are used to identify certain elements of the structure, it is well known that they may be used interchangeably, and connectors having both plug and socket elements on each mating half are known, so there is no particular significance to be attached to the terms.

In FIG. 1, element 34$_2$ of socket 34 is connected to input point 10i$_2$, which in turn is connected by way of a conductor 36 to a socket element 40$_3$ of "charger output" socket 40. Conductor 23o1, connected to the + output 22o1 of the conditioner 22, is connected to a socket element 40$_1$ of socket 40. Conductor 23o2 is connected to the − output 22o2 of the conditioner 22, and combined or mutually connected conductors 16p2/23o2 is/are connected to socket element 40$_2$. Conductor 36 connects socket element 40$_3$ of charger output socket 40 to AC input point 10i$_2$. As so far described, in the absence of a connection of appliance plug 42 to charger output socket 40, the charger will not produce charging voltage or current even when AC plug 12 is connected to the mains, because there is no complete circuit to the primary winding 16p of transformer 16.

A plug 42 is associated with the appliance 46 to be charged. This association may be a direct mounting or connection of the appliance 46 to the plug 42, or it may be implemented by way of a power cord 44 which includes conductors 44$_1$ and 44$_2$. Plug 42 includes plug elements 42$_1$, 42$_2$, and 42$_3$. Plug elements 42$_1$, 42$_2$, and 42$_3$ are dimensioned to mate with socket elements 40$_1$, 40$_2$, and 40$_3$, respectively, of charger socket 40, to make electrical connections therewith. Plug element 42$_2$ is connected by a conductor 42$_4$ to plug element 42$_3$. This connection may be made within the appliance plug 42 as illustrated, or alternatively may be made within the appliance 46 if cord 44 is provided with a sufficient number of conductors. Conductor 44$_1$ connects element 42$_1$ of plug 42 to input 46a of appliance 46, and conductor 44$_2$ connects element 42$_2$ of plug 42 to input 46b of appliance 46.

With the connections as illustrated in FIG. 1, with mains AC power applied to points 10i$_1$ and 10i$_2$, and with plug 42 mated with socket 40, a complete circuit from the mains to the primary winding 16p of transformer 16 is made by way of a path including conductor 16p1, 16p2, socket element 40$_2$, plug element 42$_2$, conductor 42$_4$, plug element 42$_3$, socket element 40$_3$, and conductor 36. Thus, when the plug-and-socket arrangement 40/42 is mated, and AC power is applied to (or "across," in electrical jargon) points 10i1 and 10i2, primary winding 16p is energized to draw current to produce magnetization of the transformer and to supply charging voltage or current to the output of the conditioner 22. The charging voltage or current appears at output ports 22o1 and 22o2 and on conductors 23o1 and 23o2, respectively, of conditioner 22, and is applied by way of socket elements 40$_1$ and 40$_2$ of socket 40 to plug elements 42$_1$ and 42$_2$, respectively, of plug 42, and by conductors 44$_1$ and 44$_2$, respectively, to power input points of appliance 46. Thus, with alternating-mains power applied to the charger 10 and socket 40 mated with plug 42, conditioned power is applied from charger 10 to appliance 46 to charge the battery 48 or to energize the appliance. Under this operating condition, the magnetizing current of the transformer 16 is necessary to aid in delivering power.

When the appliance 46 being charged (or operated in a docked state) and is removed for portable use, plug 42 is removed from or unmated with socket 40, with the result that plug element 42$_3$ is disconnected from socket element 40$_3$. This disconnection opens or renders nonconductive the complete path by which the primary winding 16p of transformer 16 receives AC energization. In the absence of AC energization, the primary winding 16p of transformer 16 cannot draw any current, including magnetizing current, thereby solving the problem by eliminating current drain due to the charger during periods when the appliance being charged or operated is removed from the charger.

Figure 2:
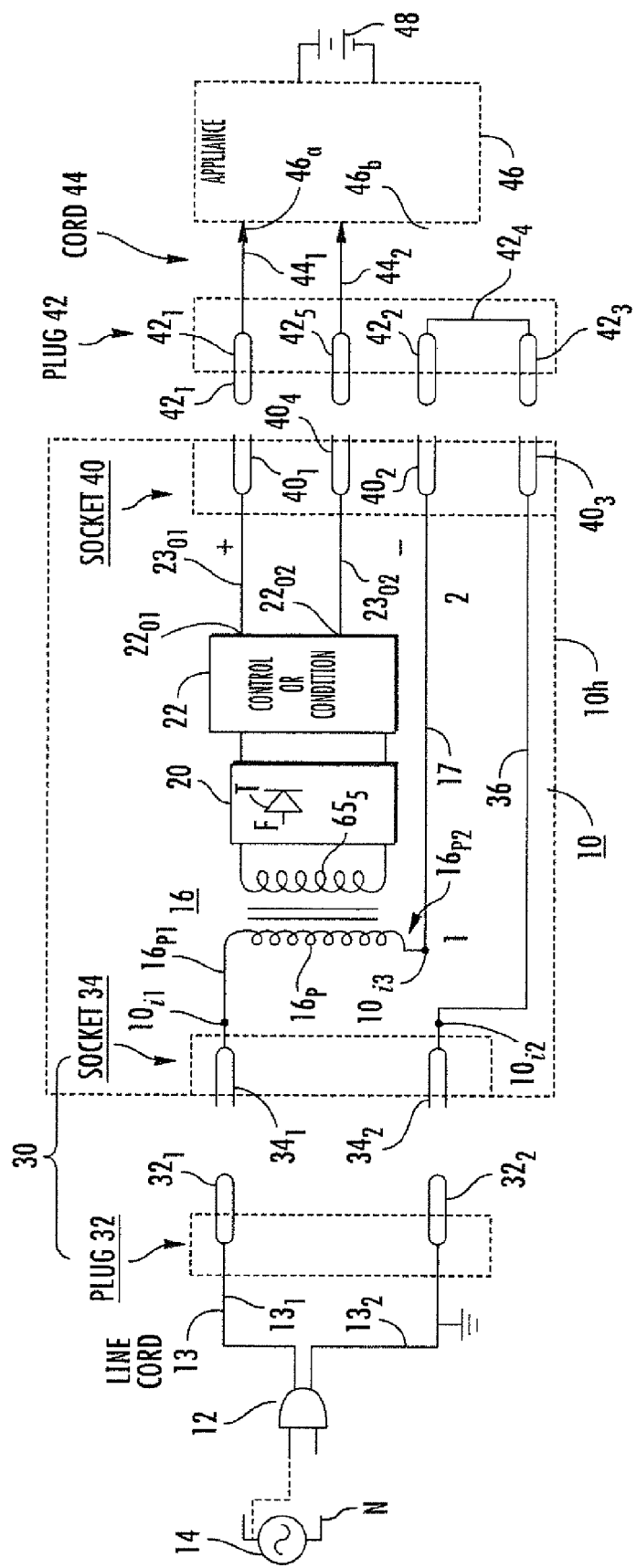
FIG. 2 is a simplified diagram in block and schematic form of a second embodiment.

FIG. 2 is a simplified schematic and block diagram similar to FIG. 1. Elements corresponding to those of FIG. 1 are designated by like reference alphanumerics. The arrangement of FIG. 2 differs from that of FIG. 1 in that the charger socket 40 and its mating plug 42 each have four elements. More particularly, charger socket 40 of FIG. 2 has four socket elements, including 40$_1$, 40$_2$, and 40$_3$ as in the case of FIG. 1. Socket element 40$_1$ is connected to conditioner output conductor 22o1, socket element 40$_2$ is connected to transformer conductor 16p2, and socket element 40$_3$ is connected to conductor 36 as in FIG. 1. Socket 40 additionally includes a further socket element 40$_4$, which is connected to conditioned power return path 23o2. Similarly, plug 42 has plug element 42$_1$ connected by way of path 44$_1$ to a power input portion of the appliance 46. As in the case of FIG. 1, plug 42$_1$ mates with socket element 40$_1$ of socket 40. Plug 42 also has plug elements 42$_2$ and 43$_3$, which are interconnected by path 42$_4$, and which mate with socket elements 40$_2$ and 40$_3$ as in the case of FIG. 1. Plug 42 of FIG. 2 further includes a plug element 42$_5$, which mates with socket element 40$_4$, and which, when mated, connects conditioner 22 output path 22o2 to conductor 44$_2$. The advantage of the arrangement of FIG. 2 is that it is not necessary to interconnect one of the conditioner 22 output conductors 223o1 and 23o2 to the neutral of the alternating-voltage power mains 14.

The arrangement of the disclosure does not require an active switch and a control circuit to disconnect the primary when the appliance is removed from the charger. It also disconnects the primary winding from the power mains without requiring operation of a separate switch, as the switching function is "built into" the socket-and-charger arrangement so that disconnecting the appliance from the charger also performs the switching function.

Other embodiments of the disclosure will be apparent to those skilled in the art. For example, while the description uses socket elements in the "socket" 40 and plug elements in the mating "plug" 42, socket elements may be used in the "plug" and plug elements in the "socket."

A plug-and-socket arrangement connects a portable appliance to a mains-powered battery charger/power supply. To avoid unwanted power consumption while the appliance is not connected, the plug-and-socket arrangement, when unplugged so that the appliance can be made portable, disconnects the mains power from the battery charger/power supply.

A mains-powered voltage adapter/charger (8) is for powering or charging an appliance (46) defining electrodes (46a, 46b) by which power or charging current may be applied. The adaptor/charger (8) comprises a housing (10h) and a transformer (16) located within the housing (10h). The transformer (16) includes a secondary winding (16s) and a primary winding (16p). The primary winding defines first and second electrodes ($16p1$, $16p2$), for generating transformed voltage at the secondary winding (16s) when mains (14) power is applied to the first ($16p1$) and second ($16p2$) electrodes of the primary winding (16). A voltage conditioner (19) is located within the housing (10h) and is electrically coupled to the secondary winding (16s), for generating conditioned voltage in response to the transformed voltage. A mating socket-and-plug arrangement (40,42) includes at least first ($40_1$, $42_1$), second ($40_2$, $42_2$) and third ($40_3$, $42_3$) mating contact sets. The socket (40) of the socket-and-plug arrangement (40, 42) is affixed to the housing (10h) so that the mating plug (42) can be mated and demated therewith. The first contact ($40_1$) of the socket (40) of the socket-and-plug arrangement (40, 42) is connected to the voltage conditioner (19) for receiving the conditioned voltage when the voltage conditioner (19) is supplied with the transformed voltage. The second contact ($40_2$) of the socket (40) is connected through the housing (10h) to the second electrode ($16p2$) of the primary winding (16), and the third contact ($40_3$) of the socket is connected to a mains electrode ($10i2$, $34_2$) of the housing (10h) by a conductive path (36) extending at least partially through the housing (10h). A conductor ($42_4$) interconnects the second ($42_2$) and third ($42_3$) contacts of the plug (42) of the plug-and-socket arrangement (40, 42). A conductor ($44_1$) extends from the first contact ($42_1$) of the plug (42) to one (46a) of the electrodes (46a, 46b) of the appliance (46), whereby, (a) when the socket (40) and plug (42) are mated, and mains (14) power is applied between the first electrode ($16p1$) of the primary winding (16p) of the transformer (16) and the mains electrode ($10i2$, $34_2$) of the housing (10h), conditioned voltage is applied to the appliance (46), and (b) when mains (14) power is applied between the first electrode ($16p1$) of the primary winding (16p) of the transformer (16) and the mains electrode ($10i2$, $34_2$) of the housing (10h) and the socket (40) and plug (42) are demated, the appliance (46) is rendered independent of the housing (10h) and the primary winding (16p) of the transformer (16) is decoupled from the mains (14).

An energizing arrangement (8) according to an aspect of the disclosure is for electrically energizing, from power mains (14), a portable or at least removable electrical appliance (46). The portable appliance may include a battery (48) that can be charged when the appliance (46) is connected to the energizing arrangement. The appliance (46) includes first (46a) and second (46b) electrodes by which direct current may be applied for energization, and in this context "direct current" includes direct voltage, as known to those skilled in the art. The energizing arrangement (8) comprises one (40) of a socket (40; 42) and a plug (42; 40). The one (40) of a socket (40; 42) and a plug (42; 40) includes first ($40_1$), second ($40_2$), and third ($40_3$) mutually isolated contacts. The other one (42) of a socket and a plug (42; 40) is adapted for physical mating with the one (40) of a socket and a plug (40, 42). The other one (42) of a socket and a plug (42; 40) includes first ($42_1$), second ($42_2$), and third ($42_3$) contacts. The first contact ($42_1$) of the other one (42) of the socket and plug (40; 42) is isolated from the second ($42_2$) and third ($42_3$) contacts of the one (42) of the socket and plug (40; 42). The third contact ($42_3$) of the other one (42) of the socket and plug (42; 40) is electrically common with the second contact ($42_2$) of the other one (42) of the socket and plug (42; 40), and, when the one (40) of the socket and plug (40; 42) is mated with the other one (42) of the socket and plug (42; 40), the first contact ($40_1$) of the one (40) of the socket and plug (40; 42) is connected to the first contact ($42_1$) of the other one (42) of the socket and plug (42; 40), the second contact ($40_2$) of the one (40) of a socket and plug (40; 42) is connected to the second contact ($42_2$) of the other one (42) of the socket and plug (40; 42), and the second ($42_2$) and third ($42_3$) contacts of the other one (42) of the socket and plug (40; 42) are connected to the third ($40_3$) contact of the one (40) of the socket and plug (40; 42). The energizing arrangement (8) includes an energizing or charging current converter, or "charger" (10), which may perform voltage or current regulation, or both as in the case of a foldback regulator. The charger (10) includes first ($10i_1$), second ($10i_2$), third ($10i_3$), and fourth ($22o1$) electrodes. The third electrode ($10i3$) is electrically connected to the transformer electrode ($16p2$) and the conditioner electrode ($22o2$). The charger (10) is energized when its second ($10i2$) and third ($10i3$) electrodes are connected and mains power is applied to the first ($10i_1$) and third ($10i_3$) electrodes of the charger, and when so energized, the charger produces energizing potential between the fourth ($22o1$) and third ($10i_3$) electrodes of the charger (10). A first electrical conductor (36) is connected to the third contact ($40_3$) of the one (40) of a socket and plug (40, 42) and is adapted to be connected to the power mains (14). A second electrical conductor ($13_1$, $34_1$) is connected to the first electrode ($10i_1$) of the charger (10) and is adapted to be connected to the of the power mains (14). A third electrical conductor ($23o1$) is connected to the fourth electrode ($22o1$) of the charger (10) and to the first contact ($40_1$) of the one (40) of the socket and plug (40; 42). A fourth electrical conductor ($44_1$) is connected to the first contact ($42_1$) of the other one (42) of the socket and plug (40, 42) and to the first electrode (46a) of the appliance (46). A fifth electrical conductor ($44_2$) is connected to at least one of the second ($42_2$) and third ($42_3$) contacts of the other one (42) of the socket and plug (40; 42) and to the second electrode (46b) of the appliance (46). A sixth electrical conductor (17) is connected to the third electrode ($10i3$) of the charger (10) and to the second contact ($40_2$) of the one (40) of the socket and plug (40; 42). A seventh electrical conductor ($42_4$) connects the second and third contacts of the other one of the socket and plug. As a result, when the socket (40) and plug (42) are mated the second ($10i2$) and third ($10i3$) electrodes of the charger are connected and the charger (10) is energized, the first contact ($42_1$) of the other one (42) of the socket and plug (40; 42) is electrically connected ($44_1$) to the first direct-current electrode (46a) of the appliance (46), and at least one of the second ($42_2$) and third ($42_3$) contacts of the other one (42) of the socket and plug (40; 42) is electrically connected ($44_2$) to the second (46b) direct-current electrode of the appliance (46), and the charger applies energizing or charging voltage to the appliance (46). When the other one (42) of the socket and plug (40; 42) is not mated with the one (40) of the socket and plug (40; 42), the second and third electrodes of the charger are disconnected and the charger (10) draws no current from the mains (14).

A charger or power source (8) according to an aspect of the disclosure is for use with an appliance (46), where the appliance (46) is energized or charged by application of conditioned voltage across first (46a) and second (46b) electrodes. The charger or power source comprises a housing (10) containing a transformer (16). The transformer (16) includes a primary winding (16p) defining first (16p1) and second (16p2) electrodes, for generating secondary power when the first (16p1) and second (16p2) electrodes of the transformer (16) are energized from alternating-current power mains (14). The housing (10) also includes at least one contact ($34_2$, $10i2$) adapted to be connected to one side (N) of the power mains (14). The housing also includes a socket (40) of a plug-and-socket arrangement (40, 42). The socket (40) includes at least first ($40_1$), second ($40_2$), and third ($40_3$) contacts. The second ($40_2$) contact of the socket (40) is connected (17) to the second electrode (16p2) of the primary winding (16p) of the transformer (16), the third contact ($40_3$) of the socket (40) is connected (36) to the one contact ($34_2$, $10i2$) of the housing (10) whereby, when the one contact is connected to the one side (N) of the power mains (14) and the first (16p1) electrode of the primary winding (16p1) of the transformer (16) is connected to the other side (H) of the power mains (14), the one side (N) of the power mains is also connected to the third contact ($40_3$) of the socket (40) and the transformer (16) is energized. The housing (10) also containing a power conditioner (20, 22) coupled to a secondary winding (16s) of the transformer (16), for, when the transformer (16) is energized, generating the conditioned voltage and applying the conditioned voltage to the first contact ($40_1$) of the socket (40). The charger or power source (8) also includes a plug (42) of the plug-and-socket arrangement (40, 42). The plug (42) includes at least first ($42_1$), second ($42_2$), and third ($42_3$) contacts, which first ($42_1$), second ($42_2$), and third ($42_3$) contacts mate with the first ($40_1$), second ($40_2$), and third ($40_3$) contacts of the socket (40), respectively, when the plug-and-socket are mated. The first ($42_1$) contact of the plug (42) is connected to the first electrode (46a) of the appliance (46). The second ($42_2$) contact of the plug (42) is connected ($42_4$) to the third ($42_3$) contact of the plug (42), whereby, when the socket (40) and plug (42) are mated, the one side (N) of the power mains (14) is connected to the second electrode (16p2) of the primary winding (16p) of the transformer (16), for generating and applying the conditioned voltage to the appliance (46). In one embodiment of this disclosure, the conditioner (20, 22) generates the conditioned voltage between the first ($40_1$) and second ($40_2$) contacts of the socket (42), and the second contact ($42_2$) of the plug (42) is connected ($44_2$) to the second (46b) electrode of the appliance (46). In another embodiment of the disclosure, the socket (40) comprises a fourth contact ($40_4$), the plug (42) comprises a mating fourth contact ($42_5$), the conditioner (20, 22) generates the conditioned voltage between the first ($40_1$) and fourth ($40_4$) contacts of the socket (42), and the fourth contact ($42_5$) of the plug (42) is connected ($44_2$) to the second (46b) electrode of the appliance (46).

An energizing arrangement (8) according to an aspect of the disclosure is for electrically energizing, from power mains (14), a portable or at least removable electrical appliance (46). The portable appliance may include a battery (48) that can be charged when the appliance (46) is connected to the energizing arrangement. The appliance (46) includes first (46a) and second (46b) electrodes by which direct current may be applied for energization, and in this context "direct current" includes direct voltage, as known to those skilled in the art. The energizing arrangement (8) comprises one (40) of a socket (40; 42) and a plug (42; 40). The one (40) of a socket (40; 42) and a plug (42; 40) includes first ($40_1$), second ($40_2$), and third ($40_3$) mutually isolated contacts. The other one (42) of a socket and a plug (42; 40) is adapted for physical mating with the one (40) of a socket and a plug (40, 42). The other one (42) of a socket and a plug (42; 40) includes first ($42_1$), second ($42_2$), and third ($42_3$) contacts. The first contact ($42_1$) of the other one (42) of the socket and plug (40; 42) is isolated from the second ($42_2$) and third ($42_3$) contacts of the one (42) of the socket and plug (40; 42). The third contact ($42_3$) of the other one (42) of the socket and plug (42; 40) is electrically common with the second contact ($42_2$) of the other one (42) of the socket and plug (42; 40), and, when the one (40) of the socket and plug (40; 42) is mated with the other one (42) of the socket and plug (42; 40), the first contact ($40_1$) of the one (40) of the socket and plug (40; 42) is connected to the first contact ($42_1$) of the other one (42) of the socket and plug (42; 40), the second contact ($40_2$) of the one (40) of a socket and plug (40; 42) is connected to the second contact ($42_2$) of the other one (42) of the socket and plug (40; 42), and the second ($42_2$) and third ($42_3$) contacts of the other one (42) of the socket and plug (40; 42) are connected to the third ($40_3$) contact of the one (40) of the socket and plug (40; 42). The energizing arrangement (8) includes an energizing or charging current converter (10), which may perform voltage or current regulation, or both as in the case of a foldback regulator. The converter (10) includes first ($10i_1$), second ($10i_2$), third ($10i_3$), and fourth ($22o1$) electrodes. The third electrode ($10i3$) is electrically connected to the transformer electrode (16p2) and the conditioner electrode (22o2). The converter (10) is energized when its second ($10i2$) and third ($10i3$) electrodes are connected and mains power is applied to the first ($10i_1$) and third ($10i_3$) electrodes of the converter, and when so energized, the converter produces energizing potential between the fourth ($22o1$) and third ($10i_3$) electrodes of the converter (10). A first electrical conductor (36) is connected to the third contact ($40_3$) of the one (40) of a socket and plug (40, 42) and is adapted to be connected to the power mains (14). A second electrical conductor ($13_1$, $34_1$) is connected to the first electrode ($10i_1$) of the converter (10) and is adapted to be connected to the of the power mains (14). A third electrical conductor ($23o1$) is connected to the fourth electrode ($22o1$) of the converter (10) and to the first contact ($40_1$) of the one (40) of the socket and plug (40; 42). A fourth electrical conductor ($44_1$) is connected to the first contact ($42_1$) of the other one (42) of the socket and plug (40, 42) and to the first electrode (46a) of the appliance (46). A fifth electrical conductor ($44_2$) is connected to at least one of the second ($42_2$) and third ($42_3$) contacts of the other one (42) of the socket and plug (40; 42) and to the second electrode (46b) of the appliance (46). A sixth electrical conductor (17) is connected to the third electrode ($10i3$) of the converter (10) and to the second contact ($40_2$) of the one (40) of the socket and plug (40; 42). As a result, when the socket (40) and plug (42) are mated the second ($10i2$) and third ($10i3$) electrodes of the converter are connected and the converter (10) is energized, the first contact ($42_1$) of the other one (42) of the socket and plug (40; 42) is electrically connected ($44_1$) to the first direct-current electrode (46a) of the appliance (46), and at least one of the second ($42_2$) and third ($42_3$) contacts of the other one (42) of the socket and plug (40; 42) is electrically connected ($44_2$) to the second (46b) direct-current electrode of the appliance (46). The converter applies energizing or charging voltage to the appliance (46), and when the other one (42) of the socket and plug (40; 42) is not mated with the one (40) of the socket and plug (40; 42) the converter (10) draws no current from the mains (14).

An energizing arrangement (8) according to another aspect of the disclosure is for electrically energizing from power mains (14) a removable electrical appliance (46), where the appliance (46) has first (46a) and second (46b) electrodes by which direct current may be applied for energization. The energization may result in the charging of a battery of the appliance. The energizing arrangement (8) comprises one (40) of a socket (40; 42) and a plug (42; 40). The one (40) of a socket (40; 42) and a plug (42; 40) includes first (40₁), second (40₂), third (40₃), and fourth (40₄) mutually isolated contacts. The other one (42) of a socket and a plug (42; 40) is adapted for physical mating with the one (40) of a socket and a plug (40, 42). The other one (42) of a socket and a plug (42; 40) includes first (42₁), second (42₂), third (42₃), and fourth (42₅) contacts. The third contact (42₃) of the other one (42) of the socket and plug (42; 40) is electrically common with the second contact (42₂) of the other one (42) of the socket and plug (42; 40), and, when the one (40) of the socket and plug (40; 42) is mated with the other one (42) of the socket and plug (42; 40), the first contact (40₁) of the one (40) of the socket and plug (40; 42) is connected to the first contact (42₁) of the other one (42) of the socket and plug (42; 40), the second contact (40₂) of the one (40) of a socket and plug (40; 42) is connected to the second contact (42₂) of the other one (42) of the socket and plug (40; 42), the second (42₂) and third (42₃) contacts of the other one (42) of the socket and plug (40; 42) are connected to the second (40₂) and third (40₃) contacts of the one (40) of the socket and plug (40; 42), and the fourth (40₄) contact of the one (40) of the socket and plug (40, 42) is connected to the fourth (42₅) contact of the other one (42) of the socket and plug (40; 42). A converter (10) includes first (10i₁), second (10i₂), third (10i₃), fourth (22o1), and fifth (22o2) electrodes. The converter (10) is energized when mains power is applied to the first (10i₁) and third (10i₃) electrodes of the converter, and when so energized, produces energizing potential between the fourth (22o1) and fifth (22o2) electrodes of the converter (10). A first electrical conductor (36) is connected to the third contact (40₃) of the one (40) of a socket and plug (40, 42) and is adapted to be connected to the power mains (14). A second electrical conductor (13₁, 34₁) is connected to the first electrode (10i₁) of the converter (10) and is adapted to be connected to the power mains (14). A third electrical conductor (23o1) is connected to the fourth electrode (22o1) of the converter (10) and to the first contact (40₁) of the one (40) of the socket and plug (40; 42). A fourth electrical conductor (23o2) is connected to the fifth electrode (22o2) of the converter (10) and to the fourth contact (40₄) of the one (40) of the socket and plug (40; 42). A fifth electrical conductor (44₁) is connected to the first contact (42₁) of the other one (42) of the socket and plug (40, 42) and to the first electrode (46a) of the appliance (46). A sixth electrical conductor (44₂) is connected to at the fourth (42₅) contact of the other one (42) of the socket and plug (40; 42) and to the second electrode (46b) of the appliance (46). A seventh electrical conductor (17) is connected to the third electrode (10i3) of the converter (10) and to the second contact (40₂) of the one (40) of the socket and plug (40, 42), whereby, when the socket (40) and plug (42) are mated the second (10i2) and third (10i3) electrodes of the converter are connected and the converter (10) is energized, the first contact (42₁) of the other one (42) of the socket and plug (40; 42) is electrically connected (44₁) to the first direct-current electrode (46a) of the appliance (46), and the fourth (42₅) contact of the other one (42) of the socket and plug (40; 42) is electrically connected (44₂) to the second (46b) direct-current electrode of the appliance (46), and the converter (10) applies energizing voltage to the appliance (46). When the other one (42) of the socket and plug (40; 42) is not mated with the one (40) of the socket and plug (40; 42) the converter (10) draws no current from the mains (14).

What is claimed is:

1. A charger or power source for an appliance, which appliance is energized or charged by application of voltage to the appliance, said charger or power source comprising:
    a power mains socket having contacts for connecting the charger or power source to a power mains plug electrically connected to a power mains;
    a transformer having a primary winding and a secondary winding, and an electrical connection between a first side of the primary winding and a first power mains socket contact;
    an appliance socket having contacts for connecting the secondary winding of the transformer to an appliance plug,
    wherein an electrical connection between a second power mains socket contact and a second side of the primary winding is routed through said appliance socket and said appliance plug such that the primary winding of the transformer cannot be energized unless the appliance plug is coupled to the appliance socket.

2. The charger or power source of claim 1, wherein the electrical connection between the second power mains socket contact and the second side of the primary winding comprises a connection in the appliance plug between an appliance plug contact corresponding to an appliance socket contact electrically connected to the second power mains socket contact and an appliance plug contact corresponding to an appliance socket contact electrically connected to the second side of the primary winding.

3. The charger or power source of claim 2, further comprising a voltage conditioner between the secondary winding and the appliance socket for conditioning a voltage generated by the secondary winding before it is applied to the appliance socket contacts.

4. The charger or power source of claim 2, further comprising a rectifier between the secondary winding and the appliance socket for transforming an alternating-current voltage generated by the secondary winding to a direct-current voltage to be applied to the appliance socket contacts.

5. The charger or power source of claim 4, wherein said appliance comprises a battery for energizing said appliance, and said direct-current voltage applied to the appliance socket contacts is ultimately applied to said battery.

6. The charger or power source of claim 4, further comprising a voltage conditioner between the secondary winding and the appliance socket for conditioning the voltage from the secondary winding before it is applied to the appliance.

7. The charger or power source of claim 6, wherein said appliance comprises a battery for energizing said appliance, and said direct-current voltage applied to the appliance socket is ultimately applied to said battery.

8. The charger or power source of claim 2, wherein said power mains define hot and neutral sides, said first power mains socket contact is adapted to be connected to said hot side of said power mains and said second power mains socket contact is adapted to be connected to said neutral side of said power mains.

9. The charger or power source of claim 2, wherein a neutral side of said primary winding and a neutral side of said secondary winding are electrically connected.

10. A charger or power source for an appliance, which appliance is energized or charged by application of voltage to the appliance, said charger or power source comprising:
    a transformer having a primary winding for generating secondary winding power when said primary winding of said transformer is energized from an alternating-current power mains, a power mains socket having contacts for connecting the charger or power source to a power mains plug, including a first power mains socket contact that is electrically connected with a first side of the primary winding; and an appliance socket having contacts for connecting the charger or power source to an appliance plug, including a first appliance socket contact that is electrically connected to a first side of the secondary winding, a second appliance socket contact that is electrically connected with a second side of the primary winding and a second side of the secondary winding, and a third appliance socket contact that is electrically connected to a second power mains socket contact;

wherein, if a mains plug is coupled to the mains socket, the primary side of the transformer is not energized unless the appliance plug is coupled to said appliance socket, said appliance plug having a first, second, and third appliance plug contacts corresponding to the first, second, and third appliance socket contacts, and said appliance plug having an electrical connection between the second and third appliance plug contacts.

11. The charger or power source of claim 10, further comprising a voltage conditioner between the secondary winding and the appliance socket for conditioning the voltage from the secondary winding before it is applied to the appliance.

12. The charger or power source of claim 10, further comprising a rectifier between the secondary winding and the appliance socket for transforming an alternating-current voltage from the secondary winding to a direct-current voltage to be applied to the appliance socket.

13. The charger or power source of claim 12, wherein said appliance comprises a battery for energizing said appliance, and said direct-current voltage applied to the appliance socket is ultimately applied to said battery.

14. The charger or power source of claim 12, further comprising a voltage conditioner between the secondary winding and the appliance socket for conditioning the voltage from the secondary winding before it is applied to the appliance.

15. The charger or power source of claim 14, wherein said appliance comprises a battery for energizing said appliance, and said direct-current voltage applied to the appliance socket is ultimately applied to said battery.

16. The charger or power source of claim 15, wherein a neutral side of said primary winding and a neutral side of said secondary winding are electrically connected.

17. A charger or power source for an appliance, which appliance is energized or charged by application of voltage across first and second appliance electrodes, said charger or power source comprising:

a housing containing a transformer, said transformer including a primary winding defining first and second electrodes, for generating secondary power when said first and second electrodes of said primary winding of said transformer are energized from alternating-current power mains, said housing also including at least one contact adapted to be connected to one side of said power mains, said housing also including an appliance socket of a plug-and-socket arrangement, said appliance socket also including at least first, second, and third contacts, said first contact of said appliance socket being coupled to a secondary winding of said transformer for, when said transformer is energized, generating said voltage and applying said voltage to said first contact of said appliance socket, said second contact of said appliance socket being connected to said second electrode of said primary winding of said transformer, said third contact of said appliance socket being connected to said one contact of said housing whereby, when said one contact is connected to said one side of said power mains and said first electrode of said primary winding of said transformer is connected to the other side of said power mains, said one side of said power mains is also connected to said third contact of said appliance socket and said transformer is energized, an appliance plug of said plug-and-socket arrangement, said appliance plug also including at least first, second, and third contacts, which first, second, and third contacts mate with said first, second, and third contacts of said appliance socket, respectively, when said plug-and-socket are mated, said first contact of said appliance plug being connected to said first electrode of said appliance, said second contact of said appliance plug being connected to said third contact of said appliance plug, whereby, when said appliance socket and said appliance plug are mated, said one side of said power mains is connected to said second electrode of said primary winding of said transformer, for generating and applying said voltage to said appliance.

18. The charger or power source of claim 17, further comprising a voltage conditioner electrically positioned between the secondary winding and the appliance socket for conditioning the voltage from the secondary winding before it is applied to the appliance.

19. The charger or power source of claim 17, further comprising a rectifier between the secondary winding and the appliance socket for transforming an alternating-current voltage from the secondary winding to a direct-current voltage to be applied to the appliance socket.

20. The charger or power source of claim 19, wherein said appliance comprises a battery for energizing said appliance, and said direct-current voltage applied to the appliance socket is ultimately applied to said battery.

* * * * *